United States Patent [19]
Leach et al.

[11] Patent Number: 5,403,974
[45] Date of Patent: Apr. 4, 1995

[54] INTERLOCKING WIREWAY ASSEMBLY FOR ELECTRICAL DISTRIBUTION DEVICES

[75] Inventors: Thomas C. Leach, Lexington, Ky.; Marvin L. Linder, Cedar Rapids, Iowa

[73] Assignee: Square D Company, Palatine, Ill.

[21] Appl. No.: 2,371

[22] Filed: Jan. 8, 1993

[51] Int. Cl.6 .............................................. H02G 3/04
[52] U.S. Cl. ...................................... 174/48; 361/828
[58] Field of Search .......................... 174/48; 307/147; 200/293, 294, 303; 361/600, 601, 622, 627, 631, 634, 637, 643, 644, 652, 825, 828

[56] References Cited

U.S. PATENT DOCUMENTS

| | | | |
|---|---|---|---|
| 3,832,604 | 8/1974 | Goodridge | 361/644 |
| 3,956,675 | 5/1976 | Bauer | 317/120 |
| 4,266,266 | 5/1981 | Sanner | 361/357 |
| 4,536,052 | 8/1985 | Baker | 361/428 |
| 5,023,404 | 6/1991 | Hudson | 174/97 |
| 5,113,312 | 5/1992 | Pratt | 361/361 |
| 5,153,816 | 10/1992 | Griffin | 361/393 |

Primary Examiner—Gerald P. Tolin
Attorney, Agent, or Firm—Larry I. Golden; Kareem M. Irfan

[57] ABSTRACT

The present invention provides a wireway assembly for mounting to the housing wall of an electrical distribution device to enclose and protect electrical wiring therein. Generally rectangular, u-shaped channels have at least one aperture positioned in the channel wall to overlap the aperture of an adjacent channel to define a wireway through which the electrical wiring extends from the bight portion of one channel to the bight portion of the adjacent channel. An interlocking means manually attaches and detaches each channel with an adjacent channel and with the housing wall.

The present invention also includes a method of safely protecting electrical wiring extending across a housing wall of an electrical distribution device. The method includes the step of interlocking a plurality of u-shaped channels in an abutting position to each other and the housing wall.

5 Claims, 2 Drawing Sheets

INTERLOCKING WIREWAY ASSEMBLY FOR ELECTRICAL DISTRIBUTION DEVICES

FIELD OF THE INVENTION

The present invention relates to circuit breakers, electrical distribution devices, and the like, which have exposed electrical wiring and, more particularly, to an assembly which encloses the exposed wiring by manually and demountably interlocking adjacent wireway channels together and to the housing of the device.

BACKGROUND OF THE INVENTION

The basic functions of circuit breakers are to provide electrical system protection and coordination whenever abnormalities occur in any part of the system. The circuit breakers provide a mechanism for interrupting the electrical circuit upon the occurrence of an overload or fault condition.

Circuit breakers are often mounted in board arrangements or cells such as drawout switchgear to primarily provide a disconnect of the breaker from the line and load bus bars. There are other connections to the breaker, however, which are commonly referred to as secondary or auxiliary connections, such as power to wind-up mechanisms, remote operator controls, wiring to meters from current transformers and the like.

A test position for the breaker is often provided whereby the line and load connections are broken, but the secondary connections are closed, allowing the breaker to be tested without actual engagement of the main bus bars. This test position usually requires that electrical wiring extend from the rear of the breaker, where an electrical connection with the bus bars is maintained, to the front of the breaker where tests or other operations are performed.

Although the insulation of the electrical wiring is adequate protection against incidental shorting, it is insufficient protection against other hazards. If the electrical wiring extends through the interior of the breaker, the moving parts of the interruption mechanism can damage the wiring. Another interior hazard is thermal damage from molten metal and hot plasma resulting from the arc generated by the interruption of the circuit. Electrical wiring routed on the exterior of the breaker housing is susceptible to damage from environmental hazards or field work performed on or near the breaker.

The need to protect a breaker's electrical wiring from these hazards is compounded by the increasing demand for breakers with improved performance in smaller housings. Decreasing the proximity of internal components with one another and with neighboring equipment increases the potential for harmful interaction therebetween. Furthermore, in view of increasing safety requirements for circuit breaker compartments already in operation that do not contain a protective apparatus for exposed electrical wiring connected to the breaker, there is a need for a field-installed protective wireway assembly that fits the circuit breaker housing designs of various manufacture.

SUMMARY OF THE INVENTION

In accordance with the present invention, a wireway assembly is provided for mounting to the housing wall of an electrical distribution device to enclose and protect electrical wiring therein. The assembly includes a plurality of generally rectangular, u-shaped channels. Each channel is defined by a planar bottom body with upstanding side and end walls. The channel walls have a top edge for abutting the housing wall of the device. Each channel has a bight portion defined by the bottom body and two side walls. The bight portion has sufficient width and depth to enclose the electrical wiring between the bottom body, the channel walls and the housing wall. The assembly also includes at least one communicating aperture defined in one of the walls of each channel. Each aperture is positioned in the channel wall to overlap the aperture of an adjacent channel. The assembly further includes means for interlocking the aperture of each channel in an abutting position with the aperture of the adjacent channel to define a wireway through which the electrical wiring extends from the bight portion of one channel to the bight portion of the adjacent channel through the overlapping apertures. The interlocking means manually attaches and detaches each channel with an adjacent channel and with the housing wall. The interlocking means is integrally formed with each channel.

The present invention also contemplates an electrical distribution device for controlling electrical service. The device includes means for distributing electrical service and a housing defined by a plurality of walls. The housing encloses the distributing means. Electrical wiring extends across at least one of the housing walls. The device includes a wireway assembly having a description as disclosed above.

The present invention also includes a method of safely protecting electrical wiring extending across a housing wall of an electrical distribution device. The method includes the step of interlocking a plurality of u-shaped channels in an abutting position to each other and the housing wall. Each channel has a bottom planar body with upstanding side and end walls defining a bight portion therebetween. Each channel has at least one aperture in one of the channel walls. The channels are manually attached and detached with each other and the housing wall to define a wireway through which the electrical wiring extends from the bight portion of one channel to the bight portion of the adjacent channel through the overlapping apertures.

Preferably, the method includes the step of positioning the electrical wiring across the housing wall of the device prior to the interlocking step.

Accordingly, an object of the present invention is to provide a wireway assembly which encloses and protects the electrical wiring of a circuit breaker or other electrical device.

Another object of the present invention is to provide a wireway assembly which provides flexibility in mounting on the inside or outside of a circuit breaker housing.

A further object of the present invention is to provide a wireway assembly which can be manually mounted to the housing of a circuit breaker and, thereafter, manually removed without the need for tools or equipment.

Still another object of the present invention is provide a wireway assembly which can be entirely or partially removed for access to the electrical wiring.

A still further object of the present invention is to provide a wireway having an interlocking assembly which can be used with electrical wiring having a nonlinear pathway providing quick and easy attachment to the circuit breaker housing.

Other and further advantages, embodiments, variations and the like will be apparent to those skilled in the art from the present specification taken with the accompanying drawings and appended claims.

BRIEF DESCRIPTION OF THE DRAWINGS

In the drawings, which comprise a portion of this disclosure.

Detailed Description

Figure 1:
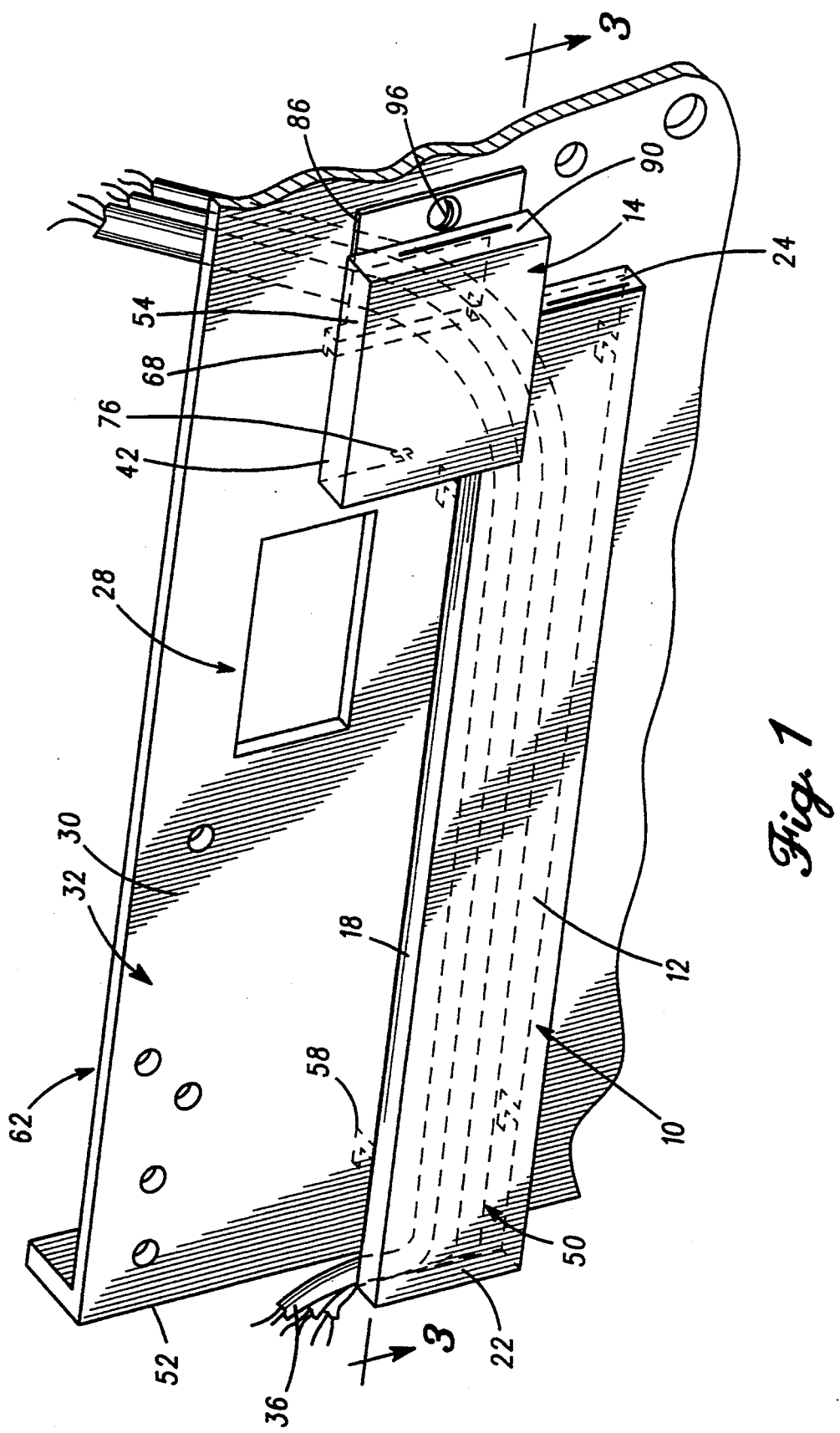
FIG. 1 is a partial perspective view of an embodiment of the present invention illustrating a multi-piece wireway assembled to the side wall of a circuit breaker housing.
Figure 2:
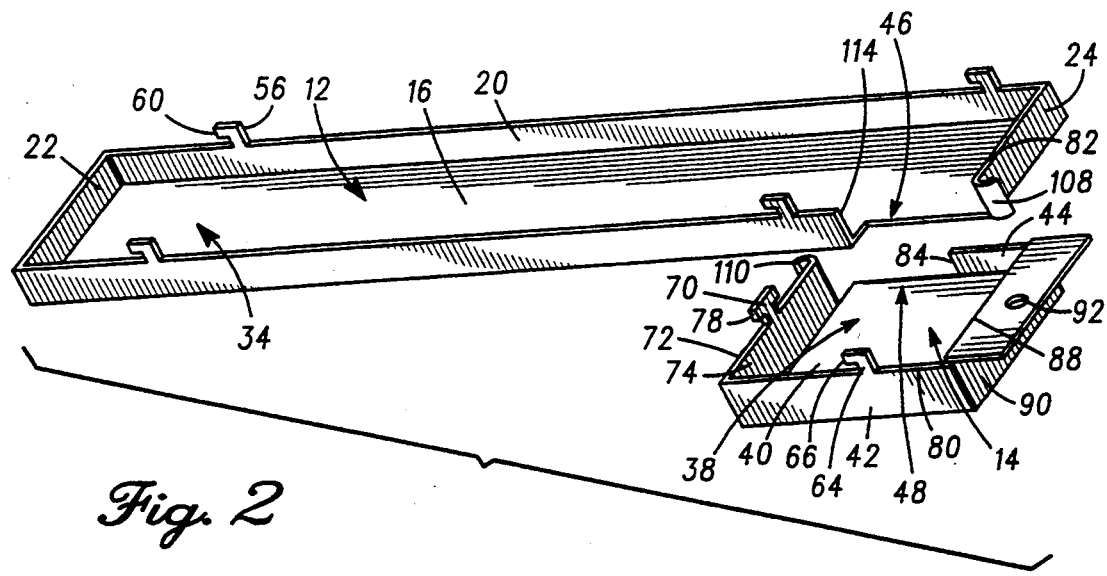
FIG. 2 is an isolated perspective view of the disassembled wireway depicted in FIG. 1.
Figure 3:
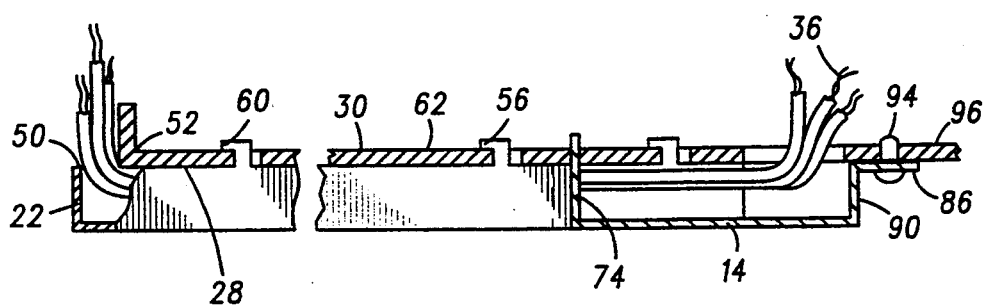
FIG. 3 is a partial cross-sectional view of the wireway assembly along lines 3—3 in FIG. 1.

Referring now to FIGS. 1, 2 and 3, the present invention provides a wireway assembly generally designated as numeral 10 having a plurality of generally rectangular, u-shaped channels like 12 and 14, Each channel like 12 is defined by a bottom body 16 having a planar shape with upstanding channel walls like side walls 18, 20 and end walls 22, 24. Each channel wall like 18 has a top edge 26 which abuts an outside face or topside 28 of housing wall 30 of a circuit breaker Each channel 12 has a bight portion 34 defined by the bottom body 16 and two side channel walls 18, 20. The bight portion 34 has sufficient width and depth to enclose the electrical wiring 36 between the bottom body 16, the side walls 18, 20 and the topside 28 of the housing wall. Similarly, channel 14 has a bight portion 38 defined by a bottom body 40 and two side walls 42, 44.

Each channel 12 has at least one communicating aperture such as 46 defined in side wall 18. The aperture 46 is positioned to overlap an aperture 48 defined in side wall 44 of channel 14. The overlapping of apertures 46 and 48 provides a communicating passageway for the wiring 32 to extend from the bight portion 34 of channel 12 to adjacent channel 14 and bight portion 38 defined therein.

The wiring 36 enters the bight portion 34 through an opening 50 formed by having the side walls 18, 20 and bottom body 16 extend past a corner edge 52 of the housing wall 30. The extension of the channel 12 positions the end wall 22 beyond the edge 52 to protect the wiring 36 from nearly all approaches. The opening 50 is defined by the top edges of side walls 18, 20, end wall 22, and the edge 52 of the housing. It is particularly advantageous of the present invention to provide protection for the wiring 36 at the housing edge 52 which is a crucial point along the wiring pathway due to the greater potential for pinching or abrasion of the wiring.

The wiring 36 continues its path across the bight portion 34 of the channel 12 through the communicating apertures 46 and 48 into the bight portion 38 of channel 14. Subsequently, the wiring 36 extends through an opening 54 in the housing wall into the interior of the circuit breaker 32. The wireway assembly 10 encloses and protects the entire length of the wiring 36 across the topside 28 of the housing wall.

The channel 12 includes a plurality of L-shaped tabs 56 which are integrally formed with and extend in a parallel direction from the top edge 26 of each channel side wall like 18. The L-shaped tabs 56 are positioned to correspond to generally rectangular-shaped holes 58 in the housing wall 30. The L-shaped tabs 56 have a distal end 60 with a pre-determined size for insertion into the holes 58. When the distal end 60 from each tab is inserted into the holes 58, the top edges like 26 of the channel walls 18 abut the topside 28 of the housing wall. Subsequently, the channel 12 and the L-shaped tabs 56 slide to engage the distal end 60 with the inside face or underside 62 of the housing wall near the holes 58.

Channel 14 similarly includes an L-shaped tab 64 with a distal end 66 for engaging a generally rectangular-shaped hole 68. Channel 14 includes another means for interlocking the channel to the housing wall by using a T-shaped tab 70. The T-shaped tab 70 is integrally formed with and extends in a parallel direction from the top edge 72 of the channel end wall 74. The T-shaped tab 70 is positioned to correspond to a generally T-shaped holes 76 in the housing wall 30. The T-shaped tab 70 has two distal ends 78 with a pre-determined size for insertion into the hole 76. When the distal ends 66, 78 from each tabs 64, 70 are respectively inserted into the holes 68 and 76, the top edges like 80 of the channel wall 42 abut the topside 28 of the housing wall. Subsequently, the channel 14 and the tabs 64, 70 slide to engage the distal ends 66, 78 with the inside face or underside 62 of the housing wall near the holes 68, 76.

As the channels 12, 14 slide into the above described interlocking position, the respective apertures 46, 48 overlap to define the wireway through which the wiring 36 extends from the bight portion 34 of channel 12 to the bight portion 38 of the adjacent channel 14. As the apertures 46, 48 overlap one another, the edges like 82, 84 defining the apertures 46, 48 abut one another to further interlock the adjacent channels 12, 14 together.

The present invention contemplates other means for interlocking the aperture 46 of each channel like 12 in an abutting position with the aperture 48 of an adjacent channel 14 to define a wireway through which the wiring 36 extends from the bight portion 34 of one channel 12 to the bight portion 38 of the adjacent channel 14 through the overlapping apertures 46, 48. For example, the L-shaped and T-shaped tabs 56, 70 can have other shapes for demountably engaging the underside 62 of the housing wall 30. Any combination of the tabs having different shapes is suitable for use. Preferably, the interlocking means manually attaches and detaches each channel with an adjacent channel and the housing wall 30.

The channel 14 includes a flange 86 which extends outwardly in a perpendicular direction to the top edge 88 of end wall 90. A screw hole 92 is provided through the flange 86 and is positioned to overlap a corresponding fastener hole 94 in the housing wall 30 as the channel 14 abuts the adjacent channel 12. A screw 96 having a pre-determined size for insertion into the screw hole 92 and corresponding hole 94 to lock the channel 14 in a fixed position. Since channel 14 is abutting channel 12, the L-shaped tabs 56 of the channel 12 remain engaged with the housing wall 30.

Although a conventional screw 96 is illustrated, other types of a locking fastener are suitable for use with the present invention. For example, the screw 96 can have conventional screw threads but utilize a wing nut head so that the screw can be manually tightened and loosened, without any tools whatsoever.

Figure 4:
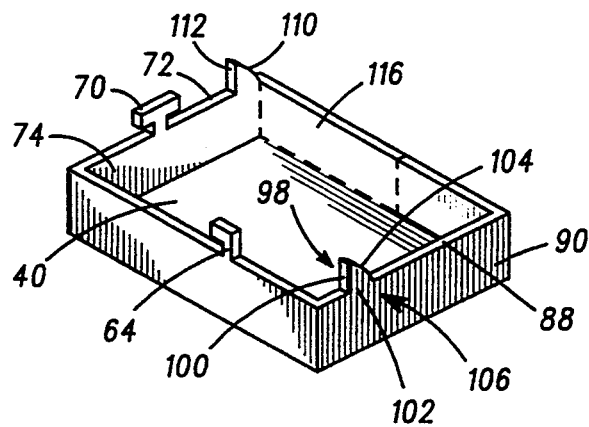
FIG. 4 is an isolated perspective view of another embodiment of the wireway assembly having an alternate securing member and knock-out member.

Another locking fastener is illustrated in FIG. 4 as a V-shaped prong 98 having two proximal ends 100, 102 and a distal end 104. The reference numerals are the same as used in the other FIGS. for similar items. One of the proximal ends 100 is attached to the top edge 88 of the end wall 90. The distal end 104 has a pre-determined size to correspond to the fastener hole 94 in the housing wall 30. The prong 98 has an indentation 106 located the opposite proximal end 102. Preferably, the prong 98 is made of a flexible material with a spring-biased memory. When the distal end 104 of the prong 98 is inserted into the fastener hole 94, the opposite proximal end 102 bends towards the attached proximal end 100. The prong 98 flexes back to its original position once the indentation 106 engages the underside 62 of the housing wall near the fastener hole 94, The prong 98 and the fastener hole 94 are positioned to overlap as the channel 14 is abutting the adjacent channel 12 in the interlocked position.

Other types of locking fasteners suitable for use with the present invention utilize a similar snap means to attach and detach the last channel into a fixed position. A variety of shapes may be substituted for the one illustrated in FIG. 4 and still lock the channel to the housing with a detachable snapping motion.

Referring now to FIG. 2, channel 12 preferably includes a curled flange 108 attached to the edge 82 of aperture 46 to abut the edge 84 defining the aperture 48 on channel 14. Similarly, a curled flange 110 is attached to the edge 112 of end wall 74 defining the aperture 48 to abut the edge 114 of side wall 18 defining the aperture 46. The curled flanges 108, 110 assist the sliding motion once channel 12 has engaged its tabs 56 and channel 14 is then slid into position to engage its tabs 64, 70 while the edges like 82, 84 are abutting. The curled flanges 108, 110 also provide protection against abrading the wiring 36 across inside edges if the wiring is pulled taunt or strained around the corners between the channels 12, 14.

Preferably, the bottom body 40 extends beyond the edge 112 of the end wall 74 and the aperture 48 to overhang the bottom body 16 at the edge of the aperture 46. This overhang assures that the wireway assembly 10 totally encloses and protects the wiring 36.

As illustrated in FIG. 4, an alternate embodiment of the wireway assembly 10 provides a removable "knock-out" 116 to cover the aperture 48 until installation. The knock-out 116 can have multiple perforated segments (not shown) provide apertures of different sizes. The channel 14 is pre-fabricated with multiple knock-outs in a variety of positions along the channel walls 42, 44, 74, and 90. Then the aperture 48 is fabricated in the field by removing the appropriate knock-out 116 to align the aperture 48 with the aperture of an adjacent channel.

The wireway assembly 10 is preferably made of an electrically insulating material which is also resistant to degradation at high temperatures. A thermoplastic resin such as, but not limited to, nylon 6, nylon 6/12 or mineral-filled nylon is suitable. Conventional plastic forming processes such as injection molding are contemplated for use in making the assemblies of the present invention. Other suitable materials include galvanized steel, plated metal, or a corrosion resistant zinc coated sheet metal with an electrostatically deposited paint finish. Should metal be used, it is preferably painted or otherwise covered with an electrically insulating coating.

As those skilled in the art will appreciate, the inventive wireway assembly can be adapted and configured for usage with a wide variety of circuit breakers and other electrical devices. The inventive wireway assembly is adaptable for protecting electrical wiring whether it follows a linear or non-linear pathway. Adapting the shape of the wireway assembly channels to utilize features of a circuit breaker casing to demountably attach the wireway thereto allows upgrading the safety of devices already in the marketplace.

The present invention can be advantageously utilized to mount the wireway assembly on the inside or outside face of a housing wall of the electrical distribution device. As described heretofore, the outside face of the housing wall 30 is the topside 28 with relation to mounting the channels 12, 14. The interior face of the housing wall is the underside 62 to which the L- and T-shaped tabs 56, 70 engage after inserting through holes in the housing wall. The present invention contemplates mounting the channels 12, 14 to the interior face of the housing wall 30 which then becomes the topside 28 and the outside face becomes the underside 62.

It will be further understood that whereas a circuit breaker housing is illustrated, the term electrical distribution device is defined to include circuit breakers and other types of control units or circuit interrupters utilizing a housing and control means located therein, including but not limited to, switchgear, panelboards, switches, fuses, and combinations thereof.

The present invention also contemplates an inventive method of safely protecting electrical wiring extending across a housing wall of an electrical distribution device. The method includes interlocking the above described channels 12, 14 in an abutting position to each other and the housing wall 30. The channels 12, 14 are manually attached and detached with each other and the housing wall 30 to define a wireway through which the electrical wiring 36 extends from the bight portion 34 of one channel 12 to the bight portion 38 of the adjacent channel 14 through the overlapping apertures 42, 44.

Another step of the method is the positioning of the electrical wiring 36 across the housing wall 30 of the circuit breaker 32 prior to the interlocking step. The inventive wireway assembly 10 allows a circuit breaker 32 to be wired without the wireway in place. Once the wiring 36 is routed, the wireway assembly 10 is installed over the wiring 36. This inventive method provides for easier routing of the wiring 36 at the factory or in the field. Should field repair or the addition of accessories be required, the wireway assembly 10 can be removed and the repairs or additions made. The same wireway assembly 10 is then simply re-attached. The inventive method avoids the time consuming and costly step of pulling wiring through an enclosed conduit or space.

The interlocking step includes inserting the tabs 56, 64, and 70 provided on the top edge like 26 of the channel wall 18 into a corresponding holes like 58 in the housing wall 30 so that the top edge 26 abuts the topside 28 of the housing wall. The tabs like 56 slide to engage their distal end 60 with the underside 62 of each housing hole. The adjacent channels 12, 14 abut one another to overlap the apertures 46, 48 of the channels. One of the channels 14 is locked in a fixed position with a fastener 96 so as to lock each abutting channel 12 to each other and the housing wall.

While particular embodiments and applications of the present invention have been illustrated and described, it is to be understood that the invention is not limited to the precise construction and compositions disclosed herein and that various modifications, changes, and variations which will be apparent to those skilled in the art may be made in the arrangement, operation, and details of construction of the invention disclosed herein without departing from the spirit and scope of the invention as defined in the appended claims.

What is claimed is:

1. A wireway assembly for mounting to a housing wall of an electrical distribution device, such as a circuit breaker, in order to enclose and protect electrical wiring leading into and out of the circuit breaker, the assembly comprising:

a plurality of adjacently positioned generally rectangular, u-shaped channels, each channel being defined by a planar bottom body with upstanding side and end walls, the channel walls having a top edge adapted to abut the housing wall of the device, each channel having a bight portion defined by the bottom body and two side walls, the bight portion having sufficient width and depth to enclose the electrical wiring;

at least one communicating aperture being defined in one of the walls of each channel, each aperture being positioned in the channel wall to overlap the aperture of an adjacently positioned channel; and means for interlocking the adjacently positioned channels with the aperture of each channel in an abutting position with the aperture of the adjacent channel, whereby the adjacently positioned channels in combination with each other define a longitudinally extending wireway supporting the electrical wiring when it is positioned so as to extend from the bight portion of one channel to the bight portion of the adjacent channel through the overlapping apertures, the interlocking means manually attaching and detaching each channel with an adjacent channel and adapted to attach and detach with the housing wall, the interlocking means being integrally formed with each channel, the interlocking means includes a locking fastener extending in a parallel direction from the top edge of one of the channel walls, the locking fastener is a V-shaped prong having two proximal ends and a distal end, one of the proximal ends being attached to the top edge of one of the channel walls, the distal end having the pre-determined size adapted for insertion into a corresponding hole in the housing wall, the prong having an indentation near the opposite proximal end, the prong being flexible whereby the opposite proximal end bends towards the attached proximal end as the distal end is inserted into the corresponding hole in the housing wall and flex to the original position once the indentation engages the underside of the housing wall, the prong being adapted to overlap the corresponding hole in the housing wall as the channel is abutting the adjacent channel.

2. A wireway assembly for mounting to a housing wall of an electrical distribution device, such as a circuit breaker, in order to enclose and protect electrical wiring leading into and out of the circuit breaker, the assembly comprising:

a plurality of adjacently positioned generally rectangular, u-shaped channels, each channel being defined by a planar bottom body with upstanding side and end walls, the channel walls having a top edge adapted to abut the housing wall of the device, each channel having a bight portion defined by the bottom body and two side walls, the bight portion having sufficient width and depth to enclose the electrical wiring;

at least one communicating aperture being defined in one of the walls of each channel, each aperture being positioned in the channel wall to overlap the aperture of an adjacently positioned channel; and means for interlocking the adjacently positioned channels with the aperture of each channel in an abutting position with the aperture of the adjacent channel, whereby the adjacently positioned channels in combination with each other define a longitudinally extending wireway supporting the electrical wiring when it is positioned so as to extend from the bight portion of one channel to the bight portion of the adjacent channel through the overlapping apertures, the interlocking means manually attaching and detaching each channel with an adjacent channel and with the housing wall, the interlocking means being integrally formed with each channel, the interlocking means includes a locking fastener extending in a parallel direction from the top edge of one of the channel walls, the locking fastener is a screw having a pre-determined size adapted for insertion into a corresponding hole in the housing wall, the top edge of one of the channel walls having a flange which extends outwardly in a perpendicular direction, the flange having a screw hole for receiving the screw therethrough, the screw hole being adapted to overlap the corresponding hole in the housing wall as the channel is abutting the adjacent channel.

3. A wireway assembly for mounting to a housing wall of an electrical distribution device, such as a circuit breaker, in order to enclose and protect electrical wiring leading into and out of the circuit breaker, the assembly comprising:

a plurality of adjacently positioned generally rectangular, u-shaped channels, each channel being defined by a planar bottom body with upstanding side and end walls, the channel walls having a top edge adapted to abut the housing wall of the device, each channel having a bight portion defined by the bottom body and two side walls, the bight portion having sufficient width and depth to enclose the electrical wiring;

at least one communicating aperture being defined in one of the walls of each channel, each aperture being positioned in the channel wall to overlap the aperture of an adjacently positioned channel; and means for interlocking the adjacently positioned channels with the aperture of each channel in an abutting position with the aperture of the adjacent channel, whereby the adjacently positioned channels in combination with each other define a longitudinally extending wireway supporting the electrical wiring when it is positioned so as to extend from the bight portion of one channel to the bight portion of the adjacent channel through the overlapping apertures, the interlocking means manually attaching and detaching each channel with an adjacent channel and with the housing wall, the interlocking means being integrally formed with each channel, the interlocking means includes a plurality of L-shaped tabs extending in a parallel direction from the top edge of each channel side wall, the L-shaped tabs being adapted to correspond to holes in the housing wall, the L-shaped tabs having a pre-determined size adapted for insertion into the corresponding housing holes whereby engaging the distal end of the L-shaped tab with the underside of the housing hole while abutting the top edges of the channel walls with the topside of the housing wall.

4. A wireway assembly for mounting to a housing wall of an electrical distribution device, such as a circuit breaker, in order to enclose and protect electrical wiring leading into and out of the circuit breaker, the assembly comprising:

a plurality of adjacently positioned generally rectangular, u-shaped channels, each channel being defined by a planar bottom body with upstanding side and end walls, the channel walls having a top edge adapted to abut the housing wall of the device, each channel having a bight portion defined by the bottom body and two side walls, the bight portion having sufficient width and depth to enclose the electrical wiring;

at least one communicating aperture being defined in one of the walls of each channel, each aperture being positioned in the channel wall to overlap the aperture of an adjacently positioned channel; and means for interlocking the adjacently positioned channels with the aperture of each channel in an abutting position with the aperture of the adjacent channel, whereby the adjacently positioned channels in combination with each other define a longitudinally extending wireway supporting the electrical wiring when it is positioned so as to extend from the bight portion of one channel to the bight portion of the adjacent channel through the overlapping apertures, the interlocking means manually attaching and detaching each channel with an adjacent channel and with the housing wall, the interlocking means being integrally formed with each channel, the interlocking means includes at least one T-shaped tab extending in a parallel direction from the top edge of the channel end wall, the T-shaped tab being adapted to correspond to a hole in the housing wall, the T-shaped tab having a pre-determined size adapted for insertion into the corresponding hole whereby engaging the distal end of the T-shaped tab with the underside of the housing wall while abutting the top edges of the channel walls with the topside of the housing wall.

5. A wireway assembly for mounting to a housing wall of an electrical distribution device, such as a circuit breaker, in order to enclose and protect electrical wiring leading into and out of the circuit breaker, the assembly comprising:

a plurality of adjacently positioned generally rectangular, u-shaped channels, each channel being defined by a planar bottom body with upstanding side and end walls, the channel walls having a top edge adapted to abut the housing wall of the device, each channel having a bight portion defined by the bottom body and two side walls, the bight portion having sufficient width and depth to enclose the electrical wiring;

at least one communicating aperture being defined in one of the walls of each channel, each aperture being positioned in the channel wall to overlap the aperture of an adjacently positioned channel; and means for interlocking the adjacently positioned channels with the aperture of each channel in an abutting position with the aperture of the adjacent channel, whereby the adjacently positioned channels in combination with each other define a longitudinally extending wireway supporting the electrical wiring when it is positioned so as to extend from the bight portion of one channel to the bight portion of the adjacent channel through the overlapping apertures, the interlocking means manually attaching and detaching each channel with an adjacent channel and with the housing wall, the interlocking means being integrally formed with each channel, the interlocking means further includes at least one curled flange attached to an edge defining the aperture in the channel wall, the curled flange abutting the corresponding edge defining the aperture in the channel wall of the adjacent channel.

* * * * *